(12) United States Patent
Reedy et al.

(10) Patent No.: US 8,260,509 B2
(45) Date of Patent: Sep. 4, 2012

(54) VEHICLE SPEED LIMITING VIA ENGINE CONTROL COMMANDS ISSUED BY ELECTRONIC TRANSMISSION CONTROLLER

(75) Inventors: John T. Reedy, Peoria, IL (US);
Mahendra Upadhyaya, Peoria, IL (US);
James W. Landes, East Peoria, IL (US);
Arvil D. Wilson, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 1132 days.

(21) Appl. No.: 12/001,671

(22) Filed: Dec. 12, 2007

(65) Prior Publication Data

US 2009/0111652 A1  Apr. 30, 2009

Related U.S. Application Data

(60) Provisional application No. 61/001,139, filed on Oct. 31, 2007.

(51) Int. Cl.
  *G06F 7/00* (2006.01)

(52) U.S. Cl. ............... 701/51; 701/54; 701/56; 701/95; 701/101; 701/102; 477/111; 477/118; 477/131; 477/107

(58) Field of Classification Search .............. 701/51–61; 477/107–113; 180/170–171
See application file for complete search history.

(56) References Cited

U.S. PATENT DOCUMENTS

| | | | |
|---|---|---|---|
| 6,819,996 B2 * | 11/2004 | Graves et al. .................. 701/54 |
| 2005/0070385 A1 | 3/2005 | Chorng | |
| 2005/0256627 A1 | 11/2005 | Sah et al. | |
| 2010/0204895 A1 * | 8/2010 | Ziegler ........................... 701/90 |

* cited by examiner

*Primary Examiner* — Thomas Black
*Assistant Examiner* — Luke Huynh
(74) *Attorney, Agent, or Firm* — Liell & McNeil

(57) ABSTRACT

A machine includes a drive train with an electronically controlled transmission in communication with an electronic engine controller. The machine ground speed is limited by executing a vehicle speed limit algorithm in the electronic transmission controller. This algorithm generates an engine control message that is communicated to the electronic engine controller. The power output of the engine is reduced responsive to the engine control message. The machine responds by not exceeding a prescribed speed limit programmed into the electronic transmission controller. This vehicle speed limiting strategy is particularly applicable to machines without a vehicle speed limiting algorithm resident in the electronic engine controller.

20 Claims, 3 Drawing Sheets

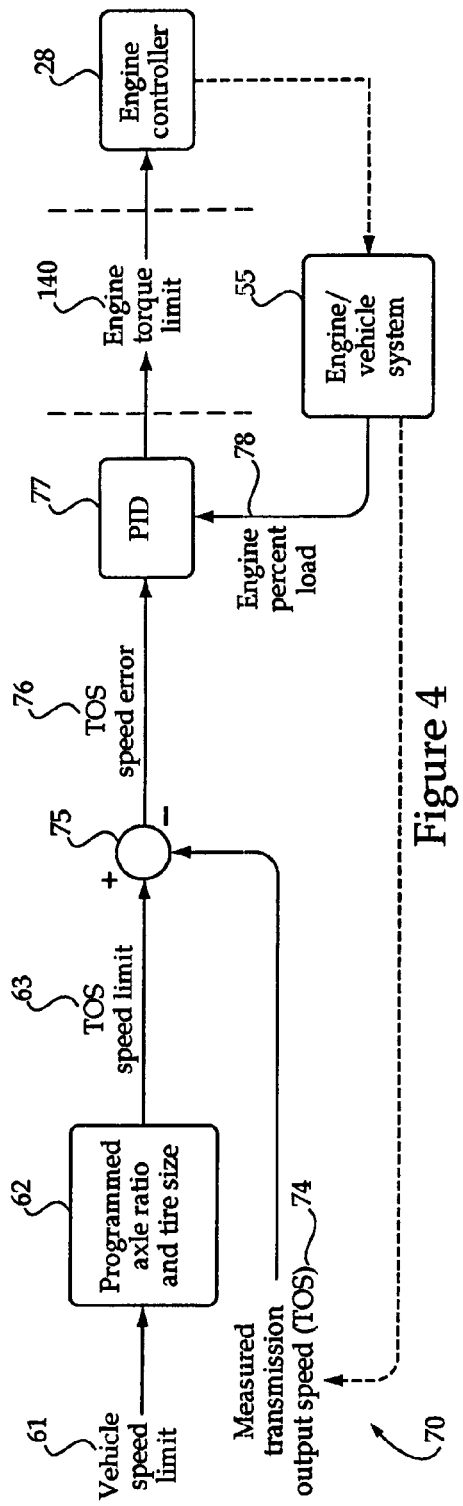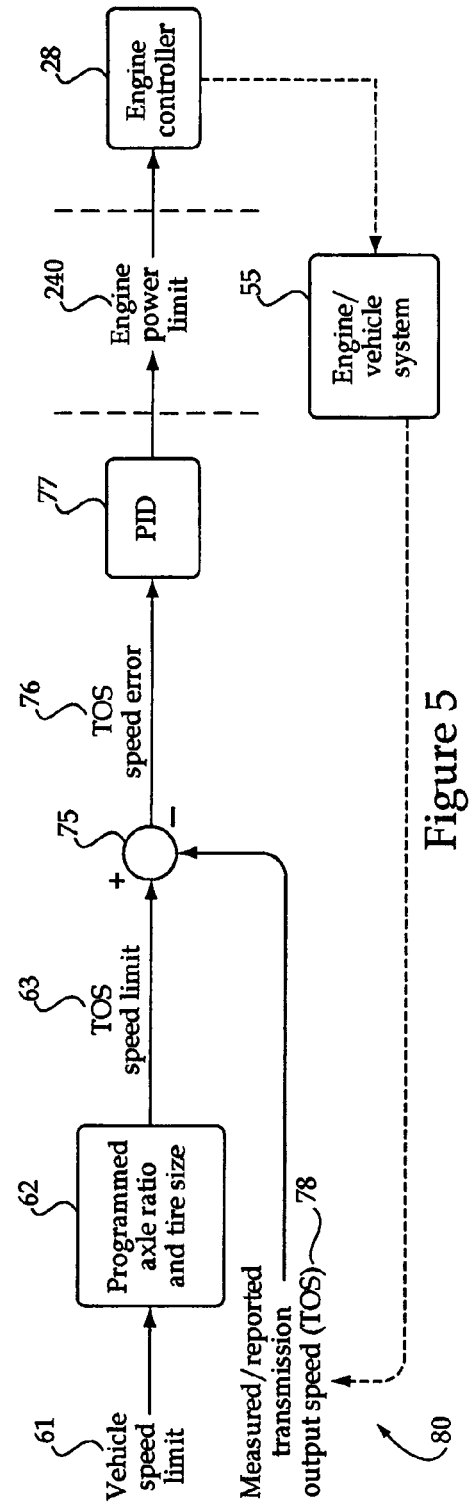

VEHICLE SPEED LIMITING VIA ENGINE CONTROL COMMANDS ISSUED BY ELECTRONIC TRANSMISSION CONTROLLER

RELATION TO OTHER PATENT APPLICATION

This application claims priority from provisional application No. 61/001,139, filed Oct. 31, 2007 with the same title.

TECHNICAL FIELD

The present disclosure relates generally to limiting ground speed of machines equipped with an electronically controlled drive train, and more particularly, to a vehicle speed limit algorithm executed in an electronic transmission controller to issue engine control messages to limit machine speed.

BACKGROUND

Vehicle speed limiting for most on-highway truck applications is typically done through a vehicle speed limiting strategy resident in the electronic engine controller. Off highway machines, such as trucks operated in shipping facilities, port facilities or large factory/warehouse operations, may not be on-highway legal, and are therefore not required to meet on-highway emissions regulations. In addition, these trucks often use less expensive so called "industrial engines" that do not have built in vehicle speed limiting strategies. Nevertheless, there still may exist vehicle speed limit regulations for off-highway machines in many jurisdictions. For instance, an off-highway machine speed may have a speed limit of 25 miles per hour. In this type of off-highway machine, vehicle speed limiting has typically been accomplished by gear binding the transmission, or not allowing shifts above a certain gear, and relying upon the top engine limit speed governor on the engine to effectively limit wheel speed in the highest gear. This strategy for limiting speed is often received with frustration by many operators and also includes several other drawbacks. For instance, vehicle speed limiting through gear binding necessarily reduces efficiency and increases fuel consumption, may increase engine wear and even increase noise due to the increased engine RPM.

The present disclosure is directed to one or more of the problems set forth above.

SUMMARY OF THE DISCLOSURE

In one aspect, a method of limiting ground speed of a machine includes propelling the machine at a speed by transmitting engine power to a ground engaging member of the machine via a drive train that includes a transmission. A vehicle speed limit algorithm is executed in an electronic transmission controller to determine an engine control message. The engine control message is communicated to an electronic engine controller via a communication link. The machine speed is limited by executing an engine control algorithm in an electronic engine controller in response to the engine control message.

In another aspect, a transmission includes an electronic transmission controller attached to a housing. The electronic transmission controller includes a means for establishing a communication link with an electronic engine controller. The electronic transmission controller is configured to execute a vehicle speed limit algorithm to generate an engine control message.

In still another aspect, a machine includes a plurality of ground engaging members attached to a chassis. A drive train that includes an engine coupled to the ground engaging members is attached to the chassis. The drive train includes a transmission with the electronic transmission controller. The electronic transmission controller is configured to execute a vehicle speed limit algorithm to generate an engine control message. The machine also includes a means for communicating between the electronic transmission controller and the electronic engine controller. Finally, the machine includes means for reducing a power output of the engine responsive to a communication of the engine control message to the electronic engine controller.

BRIEF DESCRIPTION OF THE DRAWINGS

FIG. 4 is a diagrammatic illustration of a vehicle speed limiting strategy according to another embodiment of the present disclosure; and FIG. 5 is a diagrammatic illustration of a vehicle speed limit strategy according to still another embodiment of the present disclosure.

DETAILED DESCRIPTION

Figure 1:
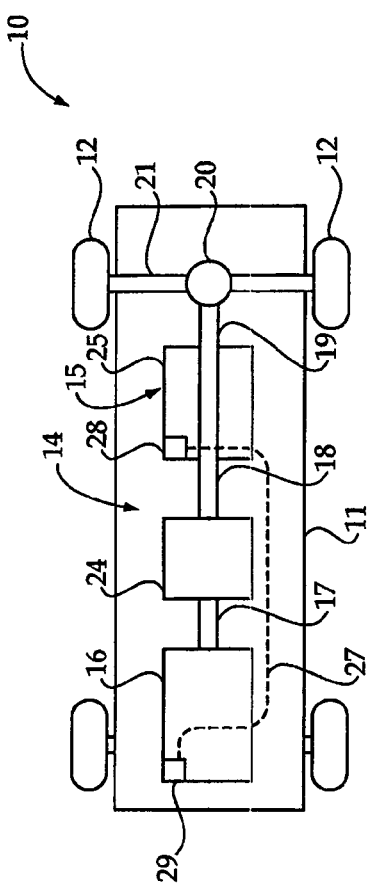
FIG. 1 is a schematic illustration of a machine according to the present disclosure.

Referring now to FIG. 1, a machine 10, which may be a vehicle such as an off-highway truck, includes a chassis 11 with an attached electronically controlled drive train 14. The chassis 11 is supported on a plurality of ground engaging members 12, such as tires or tracks. The electronically controlled drive train 14 includes an electronically controlled engine 16 coupled to the ground engaging members 12 via an electronically controlled transmission 15. The power from engine 16 is transmitted to ground engaging members 12 via an engine output shaft 17, a transmission input shaft 18, a transmission output shaft 19, a differential 20 and an axle 21. Although not necessary, electronically controlled drive train 14 may also include a torque converter 24, which may be placed selectively in a locked condition that results in engine output shaft 17 having the same rotational speed as transmission input shaft 18. When optional torque converter 24 is in an unlocked condition, the speed of shafts 17 and 18 may be different. The electronically controlled transmission 15 includes a housing 25 with an attached electronic transmission controller 28. The engine 16 includes an electronic engine controller 29 that communicates with electronic transmission controller 28 via communication link 27. Communication link 27 may be a proprietary communication link or may be a portion of a standardized communication link, such as J1939 data bus communication network standardized according to the Society of Automotive Engineers (SAE). The electronic transmission controller 28 and the electronic engine controller 29 exchange messages according to a proprietary protocol or according to standard messages formulated according to the J1939 network communication standards known in the art, or via both.

Figure 2:
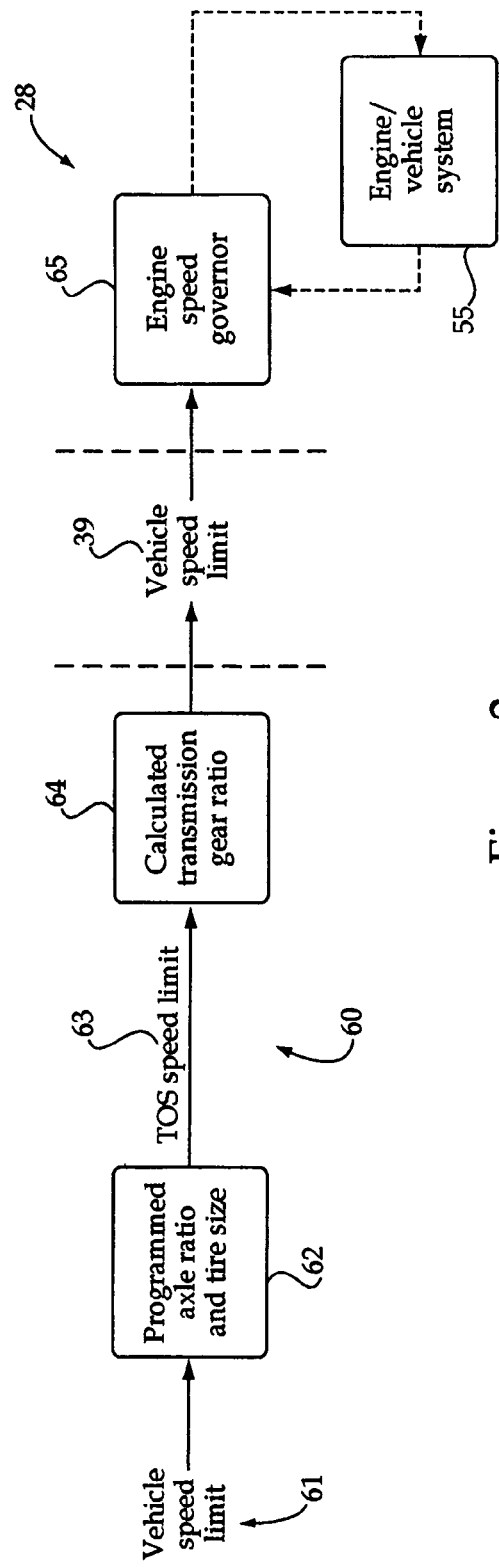
FIG. 2 is a diagrammatic illustration of a vehicle speed limiting strategy according to one embodiment of the present disclosure.
Figure 3:
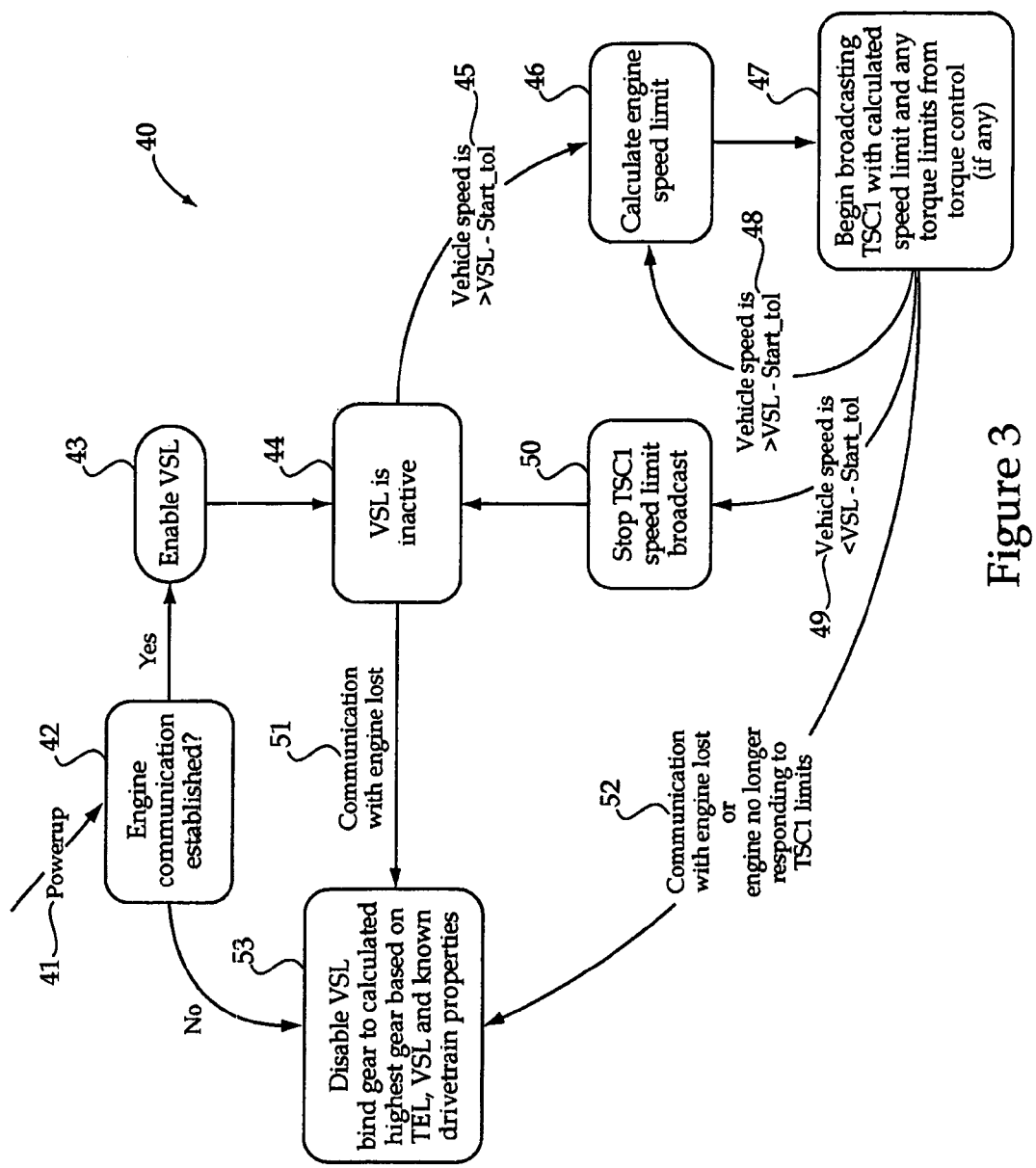
FIG. 3 is a flow diagram of a vehicle speed limit algorithm according to the present disclosure.

The present disclosure contemplates several vehicle speed limiting strategies that may be implemented using public engine control message protocols or proprietary engine control messages. For instance, the present disclosure contemplates a vehicle speed limiting strategy as shown in FIG. 2 where the TSC1 speed limit command is utilized as a strategy for limiting vehicle speed. Those skilled in the art recognize that the TSC1 engine control message is standardized with regard to content and order. FIG. 3 shows the usage of the same TSC1 engine control message except utilizing the vehicle speed limit strategy according to another embodiment utilizing the torque limit command field of the TSC1 message. Finally, FIG. 5 shows an additional vehicle speed limit strategy that utilizes a proprietary power limit message sent to the engine from the electronic transmission controller as a means by which the vehicle speed is limited. Other more cumbersome strategies could be utilized, such as inserting some other engine control message, such as an artificially low smoke limit value, that causes the engine to reduce fuel, reduce power output and hence limit the vehicle speed. Thus, other strategies that might occur to one with ordinary skill in the art fall within the intended scope of the present disclosure.

In any of the strategies, it will likely be necessary to enter into the software what vehicle speed limit is desired. For instance, that vehicle speed limit may vary from jurisdiction to jurisdiction or be based upon owner preferences. This feature is shown in FIGS. 2, 4 and 5 as Item 61 where a device, such as a service tool, is in communication with the electronic transmission controller 28 of FIG. 1 and the vehicle speed limit is stored in memory available to the electronic transmission controller 28. Next, there may also be data entered into the electronic transmission controller 28 relating the ratio of transmission shaft output speed to vehicle speed. This is shown as Item 62 in FIGS. 2, 4, and 5. This item of data may be entered as a single number or may be include two or more data entries and stored in memory to the electronic transmission controller 28. For instance a first entry might relate the ratio of axle speed to transmission output speed, and a second variable might relate to tire size. The vehicle speed limit and the relationship between the transmission output shaft speed and the vehicle speed is then translated by the electronic transmission controller 28 into a transmission output speed limit 63 that is also stored in memory available to the electronic transmission controller 28. Those skilled in the art will appreciate that Item 61 and 62 could possibly be eliminated by direct entry and storage of a transmission output speed limit 63 without departing from the intended scope of the present disclosure. In order to generate an engine control message for limiting speed, the transmission output speed limit 63 is translated via a calculated transmission gear ratio 64 into an engine speed limit 39. That engine speed limit 39 is inserted into the speed limit command field of the standard TSC1 engine control message generated and sent from the electronic transmission controller 28 to the electronic engine controller 29 via communication line 27 according to the standard J1939 communication protocol. The engine then receives that TSC1 control message, and via operation of its engine control algorithm limits the engine speed. As a consequence, vehicle dynamics shown at Item 55 results the vehicle's ground speed being limited. The feature of the engine control algorithm that utilizes the engine speed limit 39 may be the engine speed governor algorithm 65.

Referring now to FIG. 3, an example of the vehicle speed limit algorithm according to the present disclosure is illustrated in the context of the engine speed limit strategy 60 disclosed in relation to FIG. 2. At step 41, the machine 10 is powered up which also wakes up and powers up electronic transmission controller 28 and electronic engine controller 29. At communication diagnostic step 42, the vehicle speed limit algorithm 40 determines whether proper communication is established between the electronic transmission controller 28 and the electronic engine controller 29 via communication link 27. If there is a failure, the vehicle speed limit algorithm 40 transfers to step 53 where the vehicle speed limit algorithm is disabled and a secondary gear binding strategy for limiting vehicle speed is enabled. If the communication diagnostic step 42 provides a positive result, the vehicle speed limit strategy according to the present disclosure is enabled. After being enabled, the vehicle's speed limit strategy is placed in an inactive status at step 44. If while inactive, communication with the engine is lost via step 51, the standard gear binding strategy to limit vehicle ground speed is engaged at step 43. Periodically, such as at the clock speed of the processor associated with electronic transmission controller 28, the vehicle speed limit algorithm 40 determines whether the vehicle ground speed is greater than the vehicle speed limit 61 minus some tolerance. For instance, the tolerance might be set so that the vehicle speed limit strategy initiates commands several miles per hour below the actual prescribed vehicle speed limit so that the vehicle speed limit is not exceeded before the algorithm and machine dynamics have time to respond. If the vehicle speed is within the tolerance of the vehicle speed limit, vehicle speed limit algorithm 40 calculates an engine speed limit as discussed earlier. This engine speed limit is then inserted into the public TSC1 engine control message and communicated at step 47 to the electronic engine controller 29. In the event that communication with the electronic engine controller 29 is lost or that the engine is perceived as not responding to the TSC1 engine speed control message, the vehicle speed limit algorithm 40 may again revert to gear binding at step 53 in order to limit vehicle speed. At step 48, the vehicle speed limit algorithm 40 determines whether the vehicle ground speed is within a stop tolerance of the vehicle speed limit. If not, step 46 and 47 will repeat and the engine speed limit will be recalculated, and broadcast engine speed limit via the J1939 data link as a TSC1 engine speed limit command. If so at step 49, the algorithm will advance to step 50 where the TSC1 engine control broadcast will be stopped. However, the electronic transmission controller 28 may also be programmed such that vehicle speed limiting commands, such as via the TSC1 engine control message, will be implemented in a fashion so as not to interfere with other TSC1 limit commands necessary for transmission protection (e.g torque limiting) or for other known vehicle systems, such as an anti-lock brake system.

Referring now to FIG. 4, the alternative strategy of limiting vehicle speed via the torque limit command portion of the TSC1 engine control message is illustrated. Steps 61 and 62 are identical to that discussed earlier in arriving at the transmission output speed limit 63. The measured transmission output speed 74, which is acquired via a sensor in a known manner, is subtracted from the transmission output speed limit 63 at summer 75 to arrive at a transmission output speed error 76. This value is then supplied in a standard manner to a PID controller 77 that receives the engine percent load 78 to arrive at an engine torque limit 140. That engine torque limit is then added to the appropriate field in the TSC1 engine control message and communicated to the electronic engine controller 29. The electronic engine controller responds by executing its engine control algorithm as per the engine torque limit, which results in a limiting of vehicle ground speed due to vehicle mass properties and dynamics at step 55.

The TSC1 torque limit strategy 70 shown in FIG. 4 could possibly be combined with the engine speed limit strategy discussed in relation to FIG. 2. In such a case, the electronic transmission controller might carry software for both strategies and may include additional logic for determining which strategy to use during certain situations. For instance, if the machine is equipped with a torque converter 24 as shown in FIG. 1, the strategy might prefer to use the engine speed limit strategy if the torque converter is in a locked condition, but reverts to the torque limiting strategy 70 of FIG. 4 in the event that the electronic transmission controller 28 determines that the torque converter 24 is in an unlocked condition. In another example, the algorithm 40 may opt for vehicle speed limiting via torque limiting if a shift is detected.

Referring now to FIG. 5, an engine power limit control strategy 80 is illustrated. This strategy might be implemented using a proprietary power limit message sent to the electronic engine controller 29 from the electronic transmission controller 28, or rely on some future standardized message not yet in existence. In any event, those skilled in the art will appreciate that the engine speed limit strategy 60 of FIG. 2 and the engine torque limit strategy 70 of FIG. 4 are essentially attempting to limit engine power output in order to limit vehicle speed, but doing so in an indirect manner. The strategy 80 shown in FIG. 5 approaches this problem directly by commanding an engine power limit by passing the transmission output speed error 76 into a PID controller 87 to arrive at an engine power limit 240. This engine power limit is communicated to the electronic engine controller 29, which executes its engine control algorithm to limit power and hence limit the vehicle speed due to vehicle mass properties and system responses as shown at Item 55.

INDUSTRIAL APPLICABILITY

The present disclosure finds potential application in any machine with an electronically controlled drive train in need of vehicle speed limiting. For instance, some fleet owners desire their machines to be limited in speed, and/or vehicle speed limits may be required by regulation in certain jurisdictions. The present disclosure is especially applicable to machines that do not include vehicle speed limiting algorithms resident on their electronic engine controller. For instance, the present disclosure is particularly applicable to machines that utilize so called industrial engines, such as for use in off-highway applications. In all applicable cases, an electronically controlled transmission includes an electronic transmission controller that executes a vehicle speed limit algorithm to determine an engine control message. The engine control message is communicated to the electronic engine controller. The present disclosure might also have potential application in limiting vehicle speeds in other applications, such as low speeds associated with paint sprayers and/or highway herbicide sprayers where the engine resident VCL or vehicle speed limiting strategy or cruise control strategies in the on-highway engines are not sufficiently designed to operate at low speeds. The present disclosure is also applicable to transmission manufacturers whose electronically controlled transmissions may be mated to divergent engines when installed in a machine that is subject to vehicle speed limiting regulations and/or other requirements. For instance, the present disclosure is applicable to transmissions that might be paired with either on-highway or off-highway machines.

The vehicle speed limit strategy using engine speed control strategy 60 of FIG. 2 as well as the torque control strategy 70 of FIG. 4 might utilize standard engine control message protocols. This might be particularly appropriate for machines in which the engine 16 originates from one manufacturer and the transmission 15 originates from a second manufacturer, but the two communicate via the standard protocols associated with the J1939 data link. The vehicle speed limiting via the engine power limit strategy 80 shown in relation to FIG. 5 might find particular application in those cases where the engine 16 and transmission 15 originate from the same manufacturer so that the use of proprietary communication strategies presents little to no obstacle.

Other considerations might also apply. For instance, the engine speed limit strategy 60 of FIG. 2 has the advantage of being a relatively simple algorithm with no tuning required. In addition, it also may leverage the engine speed governor by providing less latency, which is well understood and therefore should be well tuned. On the other hand, the engine speed control strategy 60 may produce less attractive performance during shifts and cannot account for drive train variations upstream from the transmission, such as a power divider. In addition, the engine speed limit strategy 60 in FIG. 2 may produce less satisfactory performance if a torque converter is in a drive mode. The engine torque limit strategy 70 shown in FIG. 4 may have the advantage of better performance during shifts and provide better performance while a torque converter is in a drive mode. In addition, this strategy may interact better with other TSC limits, such as anti-lock brake system traction control strategies. In addition, the torque limit strategy 70 is also not likely affected by possible extra components, such as a power divider between the engine 16 and transmission 15. On the other hand, the torque limit strategy 70 of FIG. 4 may have disadvantages relative to the other strategies in that it may not perform as well during non-shifting transient performance due to delays involved a more complicated algorithm. In addition, that strategy may require application based tuning in some cases and may be more likely to limit cycle. The engine power limit strategy 80 of FIG. 5 has the advantage of likely performing best during shifts and can tolerate possible extra components, such as a power divider, between the engine 16 and transmission 15. On the other hand, this strategy currently might require a new likely proprietary power limit data link message to be developed and implemented on both the electronic engine controller 29 and the electronic transmission controller 28. In addition, it may require some application tuning as it may not perform as it does not use a well tuned engine speed governor.

In some configurations, the vehicle speed limit algorithm may detect when the vehicle ground speed is approaching within the predetermined vehicle speed limit. When that vehicle speed is within a tolerance of the vehicle's speed limit, the vehicle speed limit algorithm 40 generates an engine control message that is communicated to the electronic engine controller 29 to limit power output from the engine via an engine speed limit control message, an engine torque limit control message or an engine power limit control message. When the electronic engine controller 29 executes its engine control algorithm, the resulting limitation in power output carries through the vehicle dynamics to result in the vehicle speed limit not being exceeded. Implementation of a vehicle speed limit algorithm 40 according to the present disclosure might utilize the standard gear binding vehicle speed limit strategy in the default and only enable the alternative vehicle speed limit strategies previously discussed if certain conditions are met, such as an appropriate communication link being maintained between electronic transmission controller 28 and the electronic engine controller 29. The present disclosure also contemplates implementations of the vehicle speed limit algorithm that may allow the operator to selectively enable the vehicle speed limit algorithm 40 through some type of Boolean input, such as a hard-wired switch, a J1939 message or some mode button. In addition, the present disclosure contemplates implementations of vehicle speed limiting that may also eventually allow the operator to actively change the prescribed vehicle speed limit via some appropriate interface. The present disclosure also contemplates an error detection mode where, if the vehicle speed exceeds a vehicle speed limit by some margin, then the algorithm may assume that the engine is no longer accepting engine control messages from the electronic transmission controller 28. In such a case, the transmission may revert to gear binding as a method of limiting vehicle speed.

A vehicle speed limit strategy resident in the electronic transmission controller has several advantages over conventional gear binding strategies known in the art. For instance, operator perception should be more favorable with an engine controlled according to the present disclosure. In addition, fuel savings could be substantial due to the fact that an operator can do the same work at a lower engine RPM and hence consume far less fuel than what might be consumed using a gear binding vehicle speed limiting strategy. For instance, the fuel savings can be on the order of 15-20% or more. In addition, apart from the fuel savings and efficiency increase, one could expect far less noise by the need to rev the engine at a lower RPM to achieve the same vehicle speeds than RPM's associated with gear binding strategies.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A method of limiting ground speed of a machine, comprising the steps of:
   propelling the machine at a speed by transmitting engine power to a ground engaging member of the machine via a drive train that includes a transmission;
   executing a vehicle speed limit algorithm in an electronic transmission controller to determine an engine control message;
   communicating the engine control message to an electronic engine controller via a communication link; and
   limiting the speed responsive to the engine control message by executing an engine control algorithm in an electronic engine controller.

2. The method of claim 1 including a step of storing a vehicle speed limit in a memory coupled to the electronic transmission controller.

3. The method of claim 1 including a step of storing data relating vehicle speed to transmission output speed in a memory coupled to the electronic transmission controller.

4. The method of claim 1 including a step of determining a transmission gear ratio.

5. The method of claim 1 wherein the engine control message is part of a standardized torque/speed control message communicated via a public data bus communication standard.

6. The method of claim 5 wherein the engine control message is contained in a speed limit data field
   of a Torque/Speed Control #1 (TSC1) message of an SAE J1939 data bus communication standard.

7. The method of claim 5 wherein the engine control message is contained in a torque limit data field of a Torque/Speed Control #1 (TSC1) message of an SAE J1939 data bus communication standard.

8. The method of claim 1 wherein the engine control message includes an engine power limit.

9. The method of claim 1 wherein the step of executing the vehicle speed limit algorithm includes determining which of a speed limit and a torque limit to include in the engine control message.

10. The method of claim 1 wherein the step of executing the vehicle speed limit algorithm includes determining the speed of the machine;
    determining if the speed is within a predetermined tolerance of a predetermined speed limit; and
    generating the engine control message if the speed is within the predetermined tolerance of the predetermined speed limit.

11. The method of claim 1 including a step of determining a failure in at least one of the executing a vehicle speed limit algorithm step and the communicating step; and
    enabling a gear binding speed limit algorithm responsive to the failure.

12. The method of claim 11 including a step of storing a vehicle speed limit in a memory coupled to the electronic transmission controller;
    storing data relating vehicle speed to transmission output speed in a memory coupled to the electronic transmission controller;
    the engine control message is part of a standardized torque/speed control message communicated via a public data bus communication standard;
    the step of executing the vehicle speed limit algorithm includes determining the speed of the machine;
    determining if the speed is within a predetermined tolerance of a predetermined speed limit; and
    generating the engine control message only if the speed is within the predetermined tolerance of the predetermined speed limit.

13. A transmission comprising:
    a housing;
    an electronic transmission controller attached to the housing and including means for establishing a communication link with an electronic engine controller; and
    the electronic transmission controller being configured to execute a vehicle speed limit algorithm to generate an engine control message.

14. The transmission of claim 13 including means for storing a vehicle speed limit and data relating vehicle speed to transmission output speed in a memory coupled to the electronic transmission controller.

15. The transmission of claim 14 wherein the electronic transmission controller is configured for communication according to an SAE J1939 data bus communication standard.

16. The transmission of claim 15 including means for executing a gear binding speed limiting algorithm responsive to a predetermined failure.

17. A machine comprising:
    a chassis;
    a plurality of ground engaging members attached to the chassis;
    a drive train that includes an engine coupled to the ground engaging members attached to the chassis;
    the drive train including a transmission with an electronic transmission controller;
    the electronic transmission controller being configured to execute a vehicle speed limit algorithm to generate an engine control message;
    means for communicating between the electronic transmission controller and an electronic engine controller; and
    means for reducing a power output of the engine responsive to communication of the engine control message to the electronic engine controller.

18. The machine of claim 17 including means for storing a vehicle speed limit and data relating vehicle speed to transmission output speed in a memory coupled to the electronic transmission controller; and means for executing a gear binding speed limiting algorithm responsive to a predetermined failure.

19. The machine of claim 18 wherein the electronic transmission controller is configured for communication according to an SAE J1939 data bus communication standard.

20. The machine of claim 19 wherein the drive train includes a torque converter; and the engine control message is contained in a torque limit data field of a Torque/Speed Control #1 (TSC1) message of the SAE J1939 data bus communication standard.

* * * * *